United States Patent [19]

Park et al.

[11] Patent Number: 5,394,386
[45] Date of Patent: Feb. 28, 1995

[54] OPTICAL DISK HIGH-SPEED SEARCH CONTROL DEVICE

[75] Inventors: Jeong-il Park, Suwon; Cheol-won Lee, Euiwang, both of Rep. of Korea

[73] Assignee: Samsung Eectronics Co., Ltd., Kyungki, Rep. of Korea

[21] Appl. No.: 132,312

[22] Filed: Oct. 6, 1993

[30] Foreign Application Priority Data

Jan. 29, 1993 [KR]   Rep. of Korea ............... 93-1183

[51] Int. Cl.[6] .......................................... G11B 7/085
[52] U.S. Cl. ........................... 369/44.28; 369/32; 369/44.34; 369/54
[58] Field of Search ............... 369/32, 44.25, 44.28, 369/44.34, 54; 360/78.04–78.08

[56] References Cited

U.S. PATENT DOCUMENTS

| | | | |
|---|---|---|---|
| 5,220,547 | 6/1993 | Yasukawa et al. | 369/44.28 X |
| 5,293,364 | 3/1994 | Shimonou | 369/44.28 X |
| 5,311,490 | 5/1994 | Matoba et al. | 369/44.28 |

Primary Examiner—W. R. Young
Attorney, Agent, or Firm—Leydig, Voit & Mayer

[57] ABSTRACT

An optical disk high-speed control device and method performs a coarse seek which controls the crossing speed of optical tracks by counting a track traverse signal of an optical head in order to make the optical head reach a target track quickly and accurately in one driving operation, to reduce access time and simplify the driving circuit of an access device by minimizing the time required for fine seeking.

5 Claims, 6 Drawing Sheets

OPTICAL DISK HIGH-SPEED SEARCH CONTROL DEVICE

BACKGROUND OF THE INVENTION

The present invention relates to the data search operation of an optical head which performs a data search in a magneto-optical disk driver and, more particularly, to an optical disk high-speed search control device and method thereof which counts the number of tracks when the optical head searches the information while being driven by a voice coil motor, so as to reach the target track.

As an external memory device for a computer, optical disk devices are in wide use since the data search speed is higher than the access time of other memory devices (e.g., magnetic tape), while its memory capacity is larger. Also, the recording medium for such external memory devices can be easily exchanged.

However, a magneto-optical disk driver is hard to move at high speeds since the structure of a signal detector in the driver is more complicated and heavier than that of a magnetic disk driver. Moreover, the track pitch of an optical disk is narrow (1.6 $\mu$m), with adjacent tracks being extremely close to each other, while the amount of eccentricity for spinning the disk is approximately 50 $\mu$m. In order to reach the target track, a method which combines a coarse seek method and a fine seek method is used, with the coarse seek method performing the majority of the movement by positioning the optical head near the target track. The fine seek method forces the optical pickup to jump inward or outward from the current track, as much as the amount of the remaining track using an actuator installed within the optical head, and moves the lens toward the target track, so the pickup can ultimately reach the target track. This track-jump handling is done by applying a jump pulse to a tracking actuator.

Figure 1:
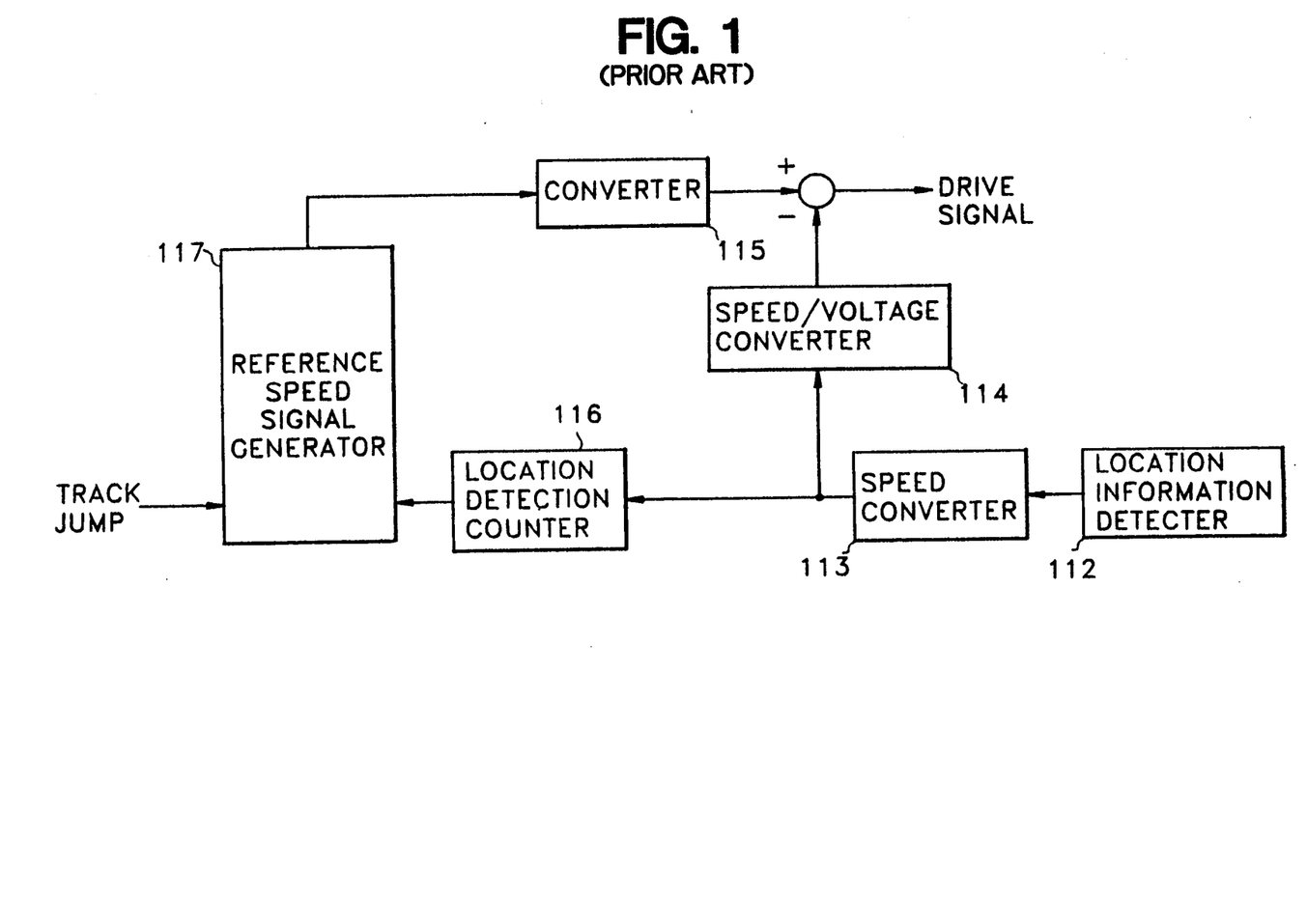
FIG. 1 is a block diagram of the conventional optical disk high-speed search control device.

FIG. 1 is a block diagram of the conventional optical disk high-speed search control device. The device comprises: a location information detector 112 which reads the location information detected by an optical pickup; a speed converter 113 which shapes and doubles a waveform of a signal which corresponds to the location from location information detector 112; a speed/voltage converter 114 which transforms the above waveform which is converted by speed converter 113 into a driving voltage; a location detection counter 116 which counts in order to detect a location from the waveform converted by speed converter 113; and a reference speed signal generator 117 which generates a reference speed signal for controlling the spinning of a disk according to the track jump command using the above location detection signal counted by location detection counter 116; and a digital-to-analog (D/A) converter 115 which converts the speed information generated from reference speed signal generator 117 into an analog signal.

Referring to FIG. 1, the driving method of the conventional optical disk high-speed search control device as constructed above will be explained in detail.

Location information detector 112 reads by linear spacing the location information detected by an optical pickup, and speed converter 113 shapes and doubles the location information detected from location information detector 112.

The signal converted in speed converter 113 is converted into a voltage in speed/voltage converter 114. Location detection counter 116 counts in order to detect the location from the converted waveform through speed converter 113. After the counting, reference speed signal generator 117 forms the counted signal into speed data which corresponds to the number of tracks counted up to the target track according to a track jump command. Also, the digital speed data is converted to an analog signal by digital-to-analog converter 115 in order to drive a signal detecting driving motor (not shown) and is then output. The motor driving signal is formed by the difference between the voltage which is output from speed/voltage converter 114 and the output motor driving voltage.

Using the data search method in accordance with the conventional optical disk high-speed search control device, the desired target track is difficult to reach correctly with just one driving operation, since the track has an eccentricity caused by the instrumental problem of location information detecting means driven by the aforementioned linear scale. As a result, the time required for fine seek is approximately 20 ms~30 ms, which impedes the realization of high speed access.

SUMMARY OF THE INVENTION

It is an object of the present invention to provide an optical disk high-speed search control device and method thereof which realize a direct seek operation that counts a track traverse signal of an optical head and performs a coarse seek which controls a traverse speed of an optical track, such that the optical pickup reaches the target track quickly and accurately in one driving action, to thereby minimize the time required for fine seeking.

To accomplish the above object, there is provided an optical disk high-speed search control device which directly counts the number of tracks of an optical disk and searches the target track at high speed, and comprises:

- a speed detector which counts a clock signal for every predetermined cycle of a track traverse signal detected by an optical pickup, and then generates a speed detecting signal which detects optical pickup movement speed,
- a track number counter which up-counts or down-counts the detected track traverse signal in accordance with the transfer direction of an optical pickup,
- a speed controller which converts the value counted by the track number counter into a reference speed in accordance with the track jump command, and
- a drive speed generator responding to the reference speed and speed detecting signal so as to generate a drive signal for the optical pickup.

Further, a method for generating a jump speed for an optical disk high-speed search control device comprises the steps of:

determining whether the track jump command is generated;
detecting the number of tracks to be jumped;
setting a speed reduction starting track number, wherein the number of tracks for starting the speed reduction when an optical pickup jumps to the target track is fixed;
determining whether the fixed speed reduction starting track has been reached;

supplying the optical pickup with predetermined speed information until the speed reduction starting track is detected;

determining whether the optical pickup reaches the target track; and supplying the optical pickup with predetermined speed reduction information until the optical pickup reaches the target track.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 2:
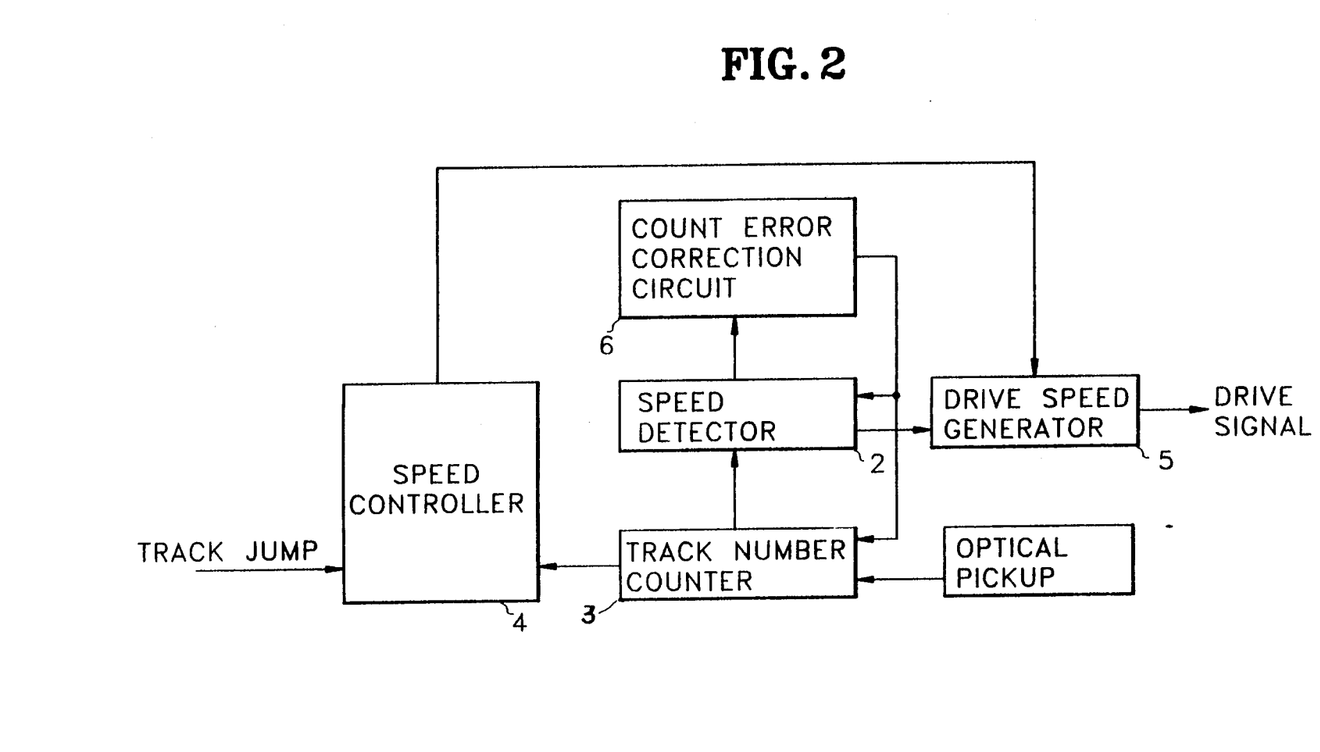
FIG. 2 is a block diagram showing an embodiment of an optical disk high-speed search control device according to the present invention.

FIG. 2 is a block diagram showing an embodiment of an optical disk high-speed search control device according to the present invention. The device comprises: an optical pickup 1 which detects a track on a magneto-optical disk; a speed detector 2 which counts a clock signal of a track traverse signal detected by optical pickup 1 and detects an optical pickup movement speed; a track number counter 3 which up-counts or down-counts the detected track traverse signal in accordance with the optical pickup transfer direction; a speed controller 4 which generates a reference speed using the value counted by track number counter 3 according to a track jump command; a drive speed generator 5 which responds to a speed command signal and speed detecting signal and generates a driving speed signal for optical pickup 1; and a count error correction circuit 6 which corrects the track that is not counted when the optical pickup passes through the offset correction mirror.

Figure 3:
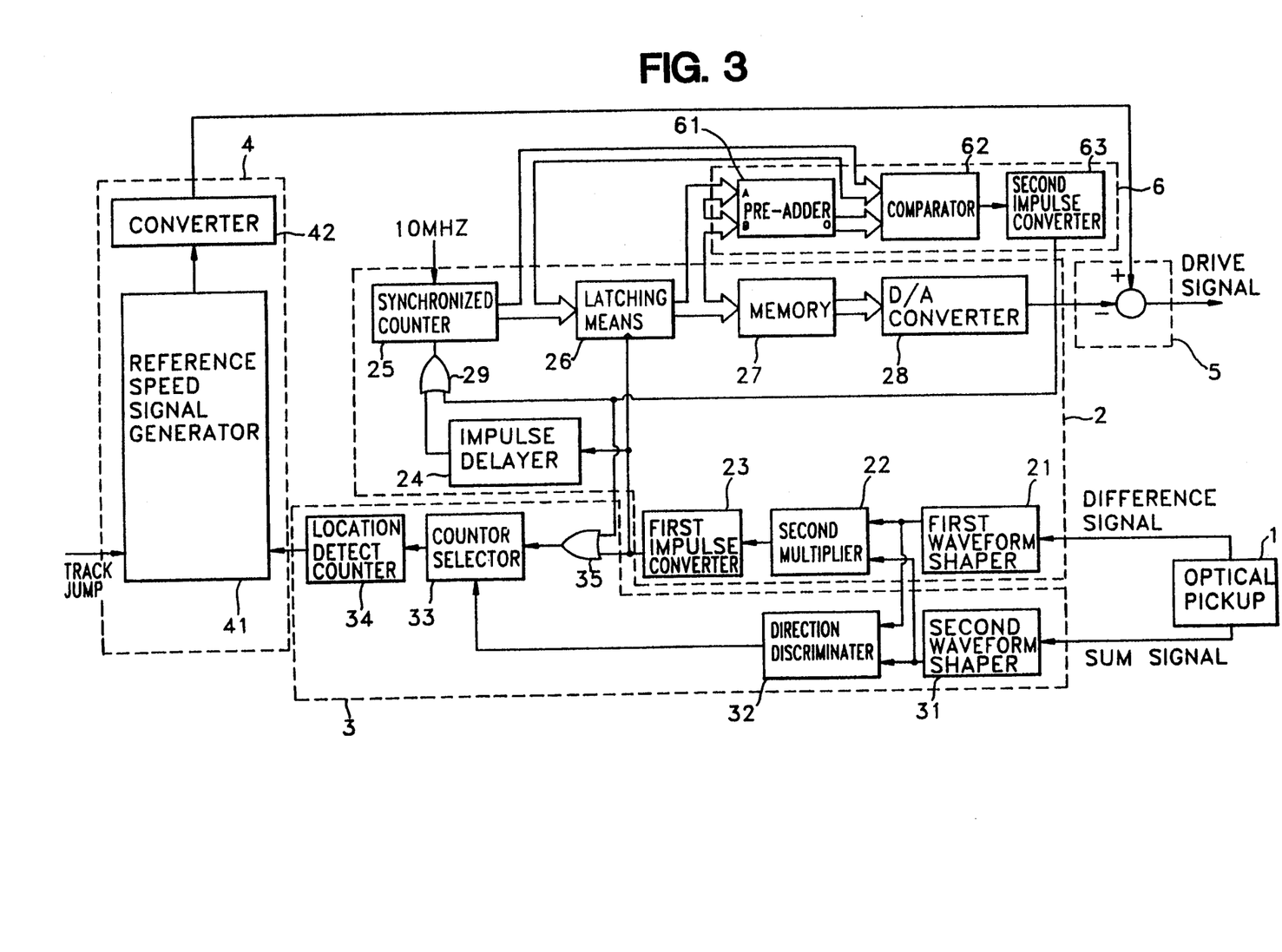
FIG. 3 is a detailed structural diagram of an optical disk high-speed search control device shown in FIG. 2.

FIG. 3 is a detailed structural diagram of an optical disk high-speed search control device shown in FIG. 2.

Speed detector 2 comprises a first waveform shaper 21 which shapes the signal detected by optical pickup 1, a doubler 22 which doubles the frequency of the signal shaped from first waveform shaper 21, a first impulse converter 23 which converts the signal output from doubler 22 into an impulse signal, an impulse delayer 24 which delays the output from first impulse converter 23 by one period, a second OR gate 29 which performs a logical sum operation using the output of impulse delayer 24 and the error correction signal, a synchronized counter 25 which counts the clock during the half cycle of the above impulse signal, a latch 26 which latches a value calculated by counting the clock during a half cycle of impulse signal, a memory 27 which stores a speed reduction/acceleration which corresponds to a jump speed, and a digital-to-analog converter 28 which receives data from memory 27 and converts it into speed information.

Track number counter 3 comprises a second waveform shaper 31 which receives and shapes the waveform output from a sum signal generator (not shown) of optical pickup 1, a direction discriminator 32 which receives the output from second waveform shaper 31 and determines the direction that optical pickup 1 is to be moved, a first OR gate 35 which performs a logical sum operation using the output of first impulse converter 23 and the error correction signal, a count selector 33 which outputs the output pulse of first OR gate 35 after selecting either a counting increase or a counting decrease in accordance with the direction signal from direction discriminator 32, a location detection counter 34 which counts the clock so as to detect a location according to the output signal provided by counting selector 33.

Speed controller 4 comprises a reference speed signal generator 41 which generates a reference speed command according to the track jump command using the output of location detection counter 34, a digital-to-analog converter 42 which converts a signal provided by reference speed signal generator 41 into an analog signal.

Counting error corrector 6 comprises a pre-adder 61 which inputs the pulse output from latch 26 and multiplies the number of pulses by 1.5 times, a comparator 62 which generates an error correction signal if the number of pulses for one cycle is 1.5 times or more than the number of pulses that are counted by synchronized counter 25, and a second impulse converter 63 which converts the error correction signal output from comparator 62 into an impulse signal.

Figure 4:
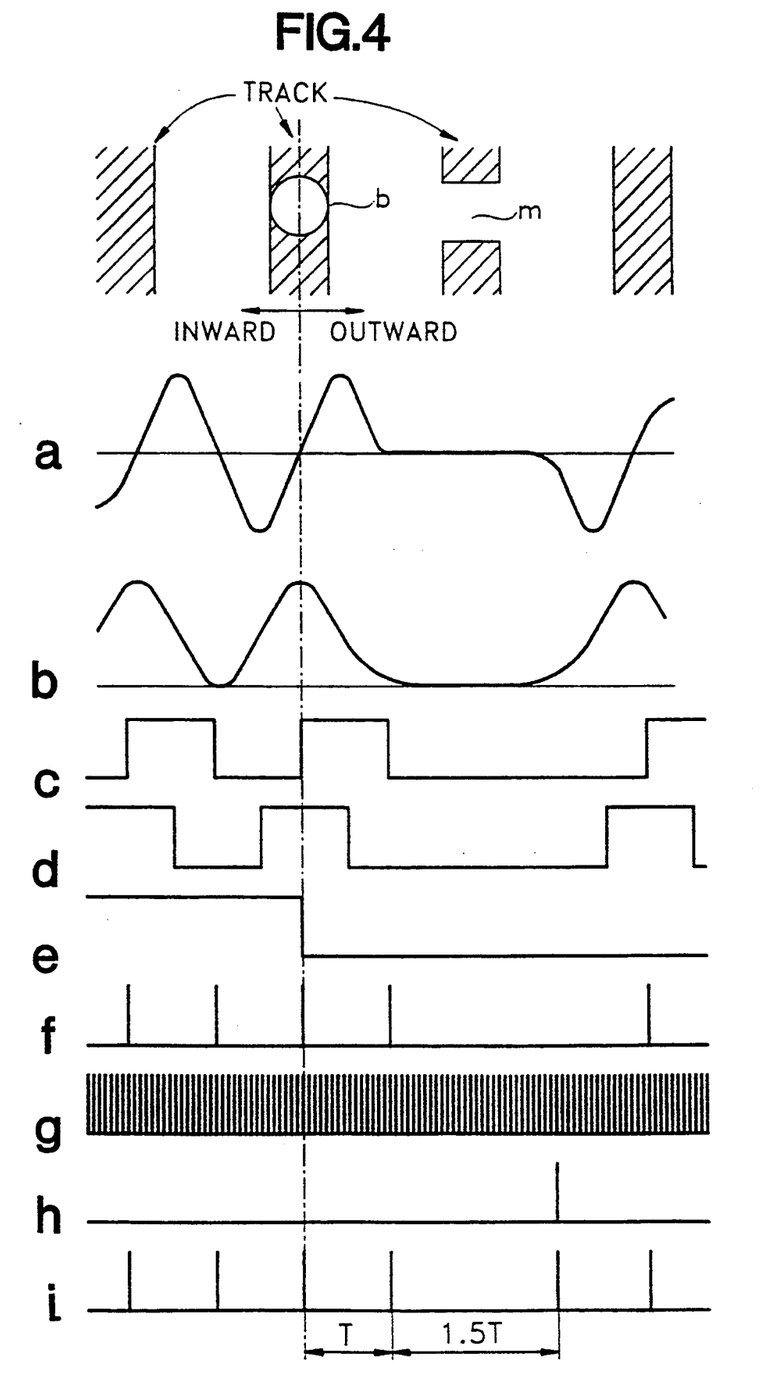
FIG. 4 is a waveform diagram of various signals generated from each part of an optical disk high-speed search control device shown in FIG. 3.

FIG. 4 is a waveform diagram of signals generated from each part of the optical disk high-speed search control device of the present invention shown in FIG. 3, and shows: a first track traverse signal a which controls a track traverse signal formed using the difference signal from optical pickup 1; a first sum signal b which is formed using the sum signal from optical pickup 1; a second track traverse signal c which is the digital form of the track traverse signal a; a second sum signal d which is the digital form of first sum signal b; a direction signal e which controls the movement direction of optical pickup 1; a first impulse signal f which is formed from the second track traverse signal; a speed detecting clock g which detects the movement speed of an optical beam; an error correction signal h which corrects the track counting error; and a second impulse signal i wherein the counting error is corrected.

Figure 5:
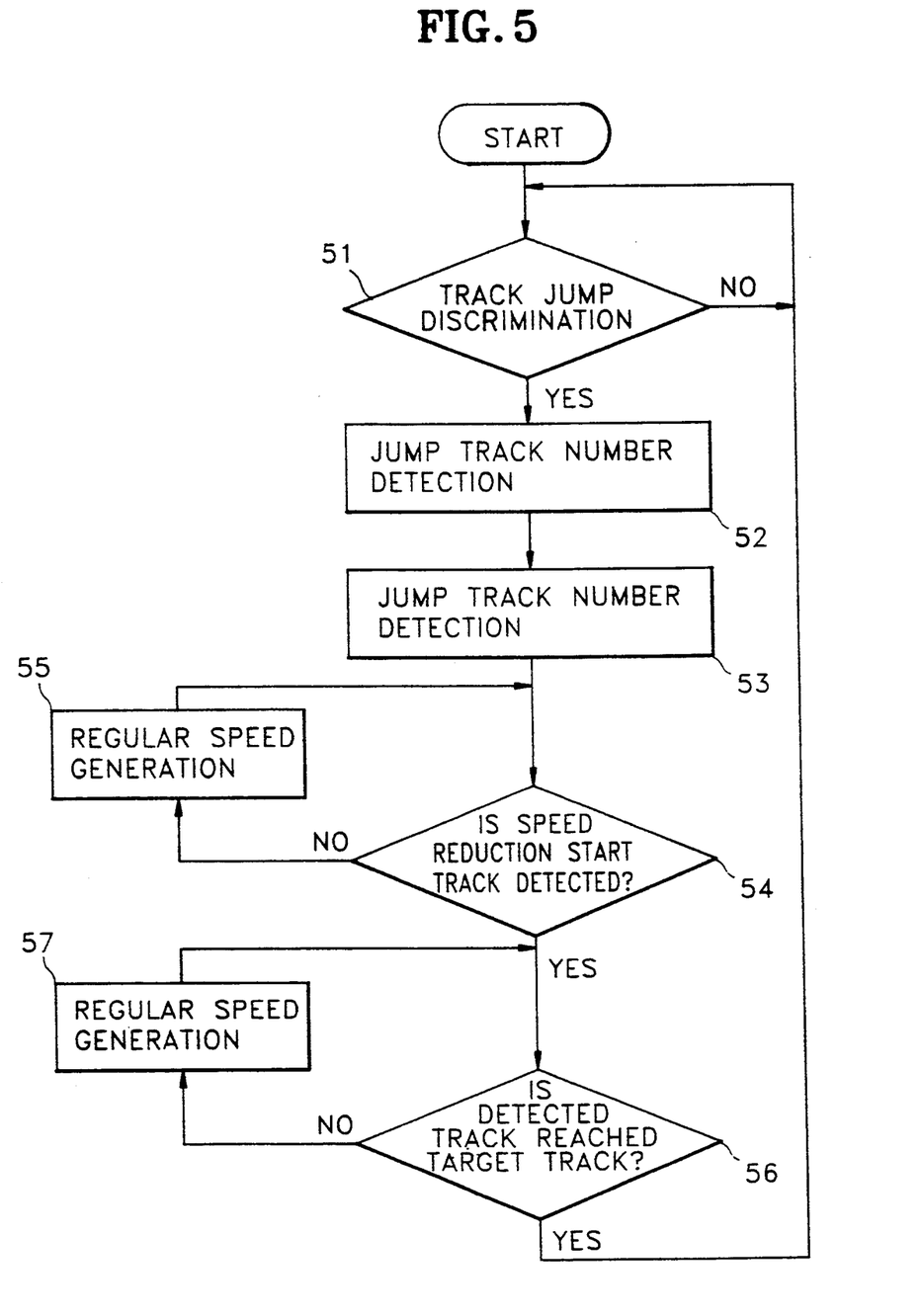
FIG. 5 is a flowchart showing the generation of a jump speed signal for an optical pickup according to the present invention.

FIG. 5 is a flowchart showing the generation of a jump speed signal of the present invention. A step 51 determines whether a track jump command is generated; a step 52 detects the number of tracks to be jumped when the track jump command is generated; a step 53 sets the number of tracks so as to start deceleration when the optical pickup jumps to the target track appointed in step 52; a step 54 determines whether the optical pickup, having started its jump to the target track, reaches the speed reduction starting track (fixed at step 53); a step 55 maintains the driving means (not shown) of optical head 1 at a constant speed until the speed reduction starting track is detected at step 54; a step 56 determines whether optical pickup 1 reaches the target track after the speed reduction starting track is detected at step 54; and a step 57 provides a regular speed reduction to optical pickup 1 until the target track is detected at step 56.

Figure 6:
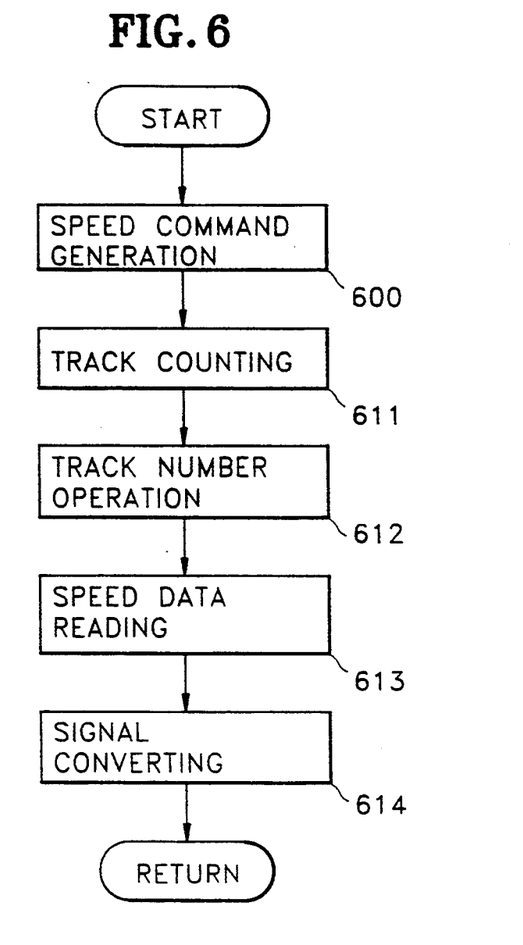
FIG. 6 is a flowchart showing the generation of a speed which moves the optical pickup from a speed reduction starting track to a target track.

FIG. 6 is a flowchart showing the generation of a speed command which moves an optical pickup from a speed reduction starting track to the target track in the above step 57. A step 600 generates a speed reduction command when the speed reduction track is detected at step 54; a step 610 counts the speed reduction starting track which is detected by the command formed at step 600; a step 620 calculates the number of tracks from the counted speed reduction starting track number to the target track; a step 630 reads from memory 27 the speed data corresponding to the number of tracks calculated at step 620; and a step 640 converts the speed data read in step 630 into an analog signal.

Figure 7:
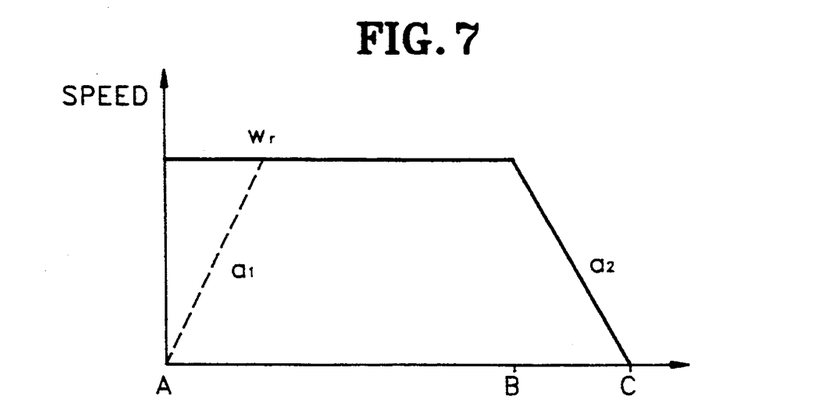
FIG. 7 is a diagram showing the speed change of an optical pickup which moves up to the target track.

FIG. 7 is a diagram showing the speed change of an optical pickup which moves up to the target track.

Referring to FIG. 7, optical pickup 1 moves toward the target track position (C) with maximum acceleration ($a_1$) in its early movement (A), and moves with deceleration ($a_2$) from speed reduction starting track (B) in accordance with the deceleration/acceleration data stored in memory 27.

The present invention will be described below in more detail with reference to the attached drawings.

Optical pickup 1 of FIG. 2 generates first track traverse signal a and first sum signal b (FIG.4) using the signal picked up from the disk. Signals a and b are 90° out of phase. Then, the sum and difference signals from optical pickup 1 are produced by first and second waveform shapers 21 and 31, and are then converted into second track traverse signal c and second sum signal d, respectively.

The following describes a movement speed detecting method of optical pickup 1. Each of the above two signals are doubled in frequency in doubler 22, and are then converted into first impulse signal f and output via first impulse converter 23. Latch means 26 latches the number of clock pulses during a half cycle of the impulse signal counted by synchronized counter 25. At the same time, impulse delayer 24 delays the impulse which is output from first impulse converter 23 as much as one clock cycle. And synchronized counter 25 is cleared by the output of second OR gate 29. Then, the number of pulses for the next half cycle is counted by synchronized counter 25 using speed detecting clock g. Since the counted value which is latched in latch 26 is inversely proportional to the speed, speed data which is inversely proportional to its address (assuming the counted value as the address) is output from memory 27 and then converted into an analog signal through digital-to-analog converter 28.

Following is a method of generating error correction signal h in order to correct the error caused by the offset correction mirror ("m" of FIG. 4) that exists on a track and by disk damage. To multiply the number of pulses output from latch means 26 by 1.5 times, the number of pulses are added to input A and then the pulse is right-shifted by one bit to input B, using preadder 61. In comparator 62, the thus-formed number of pulse is compared with the number of the next pulse output from synchronized counter 25, and then if the number of pulses of one cycle is 1.5 times or more that of the next pulse, this is recognized as an error of one track. Accordingly, comparator 62 outputs the error correction signal which is converted into second impulse signal i and output via second impulse converter 63.

The following is the method of forming the jump speed signal so as to move optical pickup 1 to the target track, when generating the jump command. Direction discriminator 32 inputs the waveform shaped in first and second waveform shapers 21 and 31, and then generates direction signal e which determines direction. According to direction signal e, count selector 33 decides whether the counting is to increase or decrease. Location detection counter 34 inputs location data on the optical pickup to reference speed signal generator 41 according to the output signal of count selector 33. Reference speed signal generator 41 then formulates and outputs a jump speed command which corresponds to the number of tracks counted from the current track where the optical pickup is located to the target track when the jump signal is generated. The jump speed command information is then converted to an analog signal through digital-to-analog converter 42, to be output.

Meanwhile, driving speed generator 5 generates the corrected driving signal using the speed command signal provided by speed controller 4 and the speed detect signal output from speed detector 2.

The jump speed data formation method of speed controller 4 will be explained with reference to FIGS. 3 and 5.

If a track jump command is generated by first determining whether the track jump command is generated in step 51, then, in step 52, optical pickup 1 detects the number of tracks to be jumped. Then, in step 53, the track for starting a speed reduction around the target track when optical pickup 1 jumps to the target track is generated corresponding to the the number of tracks detected. In step 54, optical head 1 starts its jump to the target track and it is determined whether the optical head reaches the speed reduction starting track fixed in step 53, and if the optical head doesn't reach the speed reduction starting track, in step 55, optical pickup 1 is maintained at a constant speed until the speed reduction starting track is detected.

When the speed starting track is detected in step 54, step 56 then determines whether optical pickup 1 has reached the target track, and if not, a regular speed reduction/acceleration is provided to the optical pickup in step 57.

The method of step 57 for generating regular speed reduction to move optical pickup 1 from the speed reduction starting track to the target track, can be explained with reference to FIG. 6. When the speed reduction starting track is detected in step 54, track counting step 610 starts counting the track. Also, in step 620, the counted number of tracks from the speed reduction starting track to the target track is calculated, and then the speed data corresponding to the number of above-calculated track is read from memory 27 in step 630. Then, the read speed data is converted into an analog signal in step 640.

The output jump speed value can be calculated by the equation $\omega_r = a_2 t$ wherein $\omega_r$ is jump speed, t is time and $a_2$ is speed reduction acceleration, with the location information X being expressed thus:

$$X = \int \omega_r dt = \omega_r t = \frac{\omega_r^2}{a_2}$$

That is, jump speed $\omega_r$ is proportional to the square root of X.

Accordingly, the optical disk high-speed search control device and method of the present invention performs a coarse seek operation which controls the crossing speed of optical tracks by counting the track traverse signal of an optical head in order to make the optical head reach the target track quickly and accurately in one driving operation, to thereby remarkably reduce the access time and simplify the driving circuit by minimizing the time required for fine seeking.

What is claimed is:

1. An optical disk high-speed search control device which directly counts the number of tracks of an optical disk and searches for a target track at high speed, said device comprising:
    a speed detector for counting pulses of a track traverse signal detected by an optical pickup and generating a speed detecting signal indicative of optical pickup movement speed, said speed detector including:
        (i) a first waveform shaper for shaping the signal detected by said optical pickup;
        (ii) a doubler for doubling the frequency of the signal shaped by said first waveform shaper;
        (iii) a first impulse converter for converting the signal output from said doubler into an impulse signal;
        (iv) an impulse delayer for delaying the impulse signal output from said first impulse converter by one cycle of the impulse signal;
        (v) first OR means for performing a logical sum operation on the delayed impulse signal and an error correction signal;
        (vi) a synchronized counter for counting a clock signal during a half cycle of the impulse signal;
        (vii) a latch for latching the value calculated by counting the clock signal during a half cycle of the impulse signal;
        (viii) a memory for storing speed reduction/acceleration data corresponding to a jump speed for moving the optical pickup; and
        (ix) a digital-to-analog converter receiving the speed reduction data from said memory for converting the acceleration data into an analog speed signal;
    a track number counter for counting the pulses of the detected track traverse signal in accordance with an intended transfer direction;
    a speed controller for converting the pulses counted by said track number counter into a reference speed signal in accordance with a track jump command; and
    a drive speed generator responding to the reference speed signal and speed detecting signal to generate a drive speed signal for the optical pickup.

2. The optical disk high-speed search control device according to claim 1 comprising a counting error corrector for generating the track traverse signal provided to said speed detector and track number counter when the pulses during a predetermined cycle is more than a pre-set number of pulses.

3. The optical disk high-speed search control device according to claim 1 wherein said speed detector detects optical pickup movement speed in every half cycle of the track traverse signal.

4. The optical disk high-speed search control device according to claim 1 wherein said track number counter comprises:
    a second waveform shaper for shaping the signal detected by the optical pickup;
    a direction discriminator for discriminating a direction in response to an output signal of said second waveform shaper;
    a count selector for outputting the output pulse of said first OR means after selecting a counting increase or decrease according to a direction signal output from said direction discriminator; and
    a location detection counter for counting the clock signal to detect a location according to the output signal of said count selector.

5. The optical disk high-speed search control device according to claim 4 wherein said speed controller comprises:
    a reference speed signal generator for receiving the output of said location detection counter and a track jump command and generating a reference speed signal for driving the optical pickup; and
    a second digital-to-analog converter for converting the reference speed signal into an analog signal.

* * * * *